United States Patent [19]
Desperben et al.

[11] Patent Number: 5,331,662
[45] Date of Patent: Jul. 19, 1994

[54] ADAPTIVE EQUALIZATION METHOD REDUCING INTERSYMBOL INTERFERENCE, RECEIVE DEVICE IMPLEMENTING IT AND APPLICATION THEREOF

[75] Inventors: Lydie Desperben, Bois Colombes; Ouélid Abdesselem, Paris; Pierre-Francois Kamanou, Colombes, all of France

[73] Assignee: Alcatel N.V., Amsterdam, Netherlands

[21] Appl. No.: 918,854

[22] Filed: Jul. 21, 1992

[30] Foreign Application Priority Data

Jul. 22, 1991 [FR] France .................. 91 09232

[51] Int. Cl.$^5$ .................. H03H 7/30; H04B 1/10
[52] U.S. Cl. .................. 375/14; 375/99; 375/103
[58] Field of Search .................. 375/11, 12, 13, 14, 375/15, 99, 103

[56] References Cited

U.S. PATENT DOCUMENTS

| | | | |
|---|---|---|---|
| 4,635,276 | 1/1987 | Karabinis | 375/15 |
| 5,164,962 | 11/1992 | Nakai et al. | 375/13 |

FOREIGN PATENT DOCUMENTS 0293620 7/1988 European Pat. Off. .

OTHER PUBLICATIONS

J. G. Proakis, Digital Communications, 1989, pp. 548–555.
Forney, "Maximum-Likelihood Sequence Estimation of Digital Sequences in the Presence of Intersymbol Interference", *IEEE Trans. Information Theory*, vol. IT-18 No. 3 (May 1972), pp. 363–372.

*Primary Examiner*—Stephen Chin
*Assistant Examiner*—Kevin Kim
*Attorney, Agent, or Firm*—Robbins, Berliner & Carson

[57] ABSTRACT

A digital signal is equalized, for example in cellular radio systems, to combat intersymbol interference. Each sample received is associated with an estimated symbol representing the transmitted symbol. The equalization process comprises an iterative stage of intersymbol interference elimination, each iteration comprising for each sample of a set of received samples whose value has not been determined during a previous iteration: comparing said sample with at least one confidence threshold and if said sample exceeds any of said thresholds: associating with said sample an estimated symbol whose value depends on said threshold exceeded, the value of said sample being then determined; and eliminating the intersymbol interference caused to other samples belonging to said set of received samples by said estimated symbol.

24 Claims, 2 Drawing Sheets

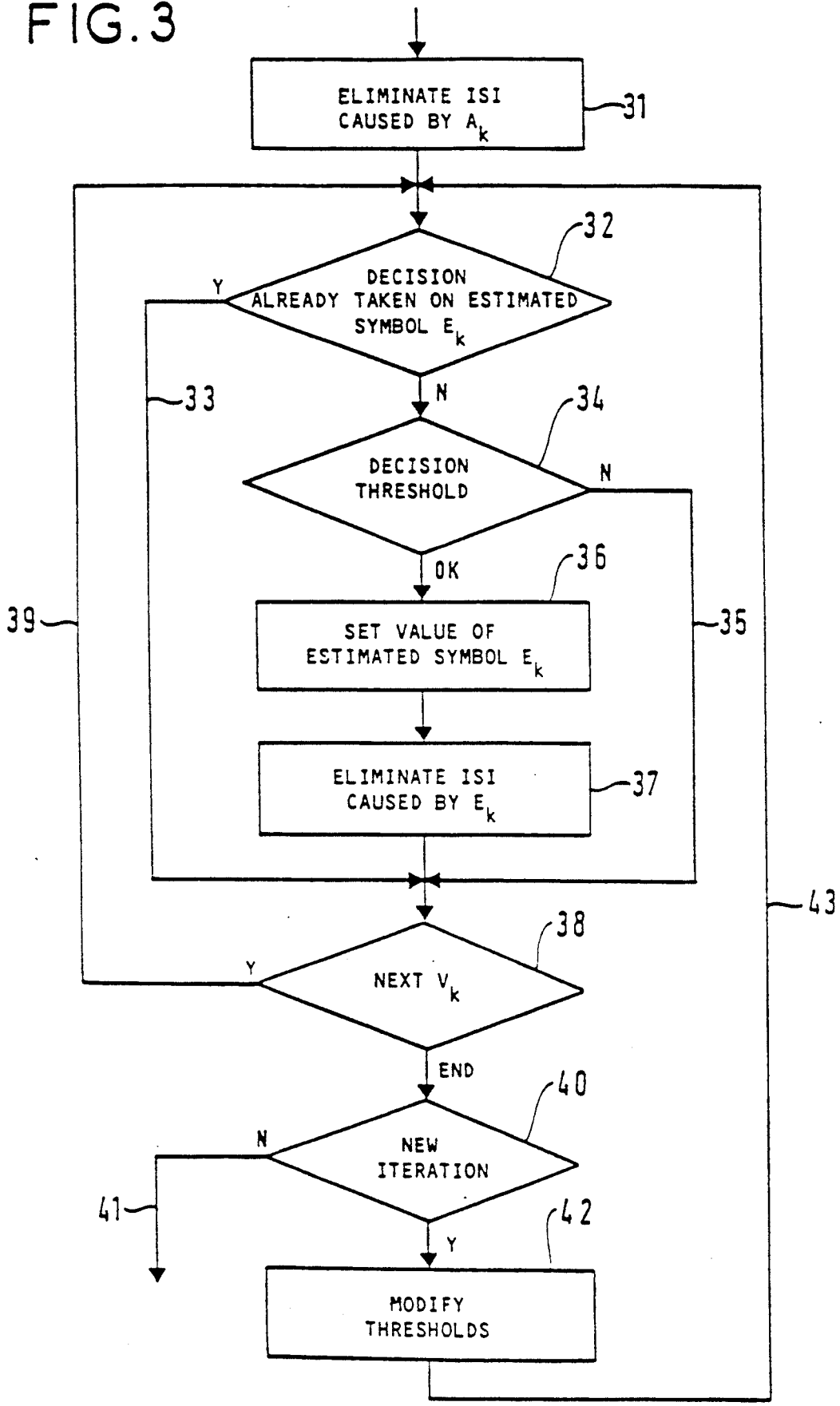

ADAPTIVE EQUALIZATION METHOD REDUCING INTERSYMBOL INTERFERENCE, RECEIVE DEVICE IMPLEMENTING IT AND APPLICATION THEREOF

BACKGROUND OF THE INVENTION

1. Field of the invention

The invention concerns the reception of digital signals. To be more precise, the invention concerns the equalization of digital signals, in particular to combat intersymbol interference.

2. Description of the Prior Art

The characteristics (amplitude, sign, phase, etc) of a received digital signal depend on a plurality of information symbols transmitted in succession rather than just one symbol. This dependency is due in particular to the multiple paths taken by the transmitted signal to reach the receiver and also, in the case of cellular radio systems, for example, to the modulation technique employed.

It is difficult to recognize each symbol transmitted independently. To achieve this it is necessary to distinguish continuously the contributions of the various symbols in order to retain only one by the process of equalization. The contributions of the other symbols constitute what is known as intersymbol interference.

The invention applies to the reception of all types of digital signal and in particular to mobile reception. The problems arising from intersymbol interference are even more crucial in mobile application because reception conditions are continually varying (with the position and speed of the mobile). The equalization must therefore adapt to cater for such variations.

A particular application of the invention is to equalize signals incorporating learning sequences whose content is known to the receiver, such as those used in the GSM (Groupe Spécial Mobile) digital cellular radio system, for example. The GSM has drawn up specifications for the pan-European cellular radiotelephone system embodied in its recommendations. Information is transmitted between base stations and mobile station in packets at carrier frequencies in the order of 1 GHz using a GMSK modulator operating at 271 kbit/s.

Each packet transmitted is made up of a sequence of known symbols called the learning sequence and a sequence of symbols varying according to the data transmitted. The learning sequence is at the center of the packet, between first and second data sequences.

Various adaptive equalization methods are already known. In the GSM context, a recursive equalizer may be used whose coefficients are determined by estimating the impulse response of the channel. This method is somewhat unreliable in the presence of low signal to noise ratios, such as occur in the presence of selective fading, which frequently occurs on the radio channel.

It is also possible to use a Viterbi equalizer which operates in two stages:

it estimates the sequence of data symbols using a maximum likelihood criterion, it subtracts the intersymbol interference.

The first stage is relatively costly in terms of processing time: this time is proportional to $2^{N_r}$ where $N_r$ is the impulse response duration expressed as a number of symbol periods.

A particular objective of the invention is to alleviate these drawbacks of the prior art.

To be more precise, an object of the invention is to provide an equalization method and device to combat intersymbol interference which are efficient and perform well under all receiving conditions, in particular in the presence of selective fading.

Another object of the invention is to provide a method of this kind which is relatively simple to implement and relatively economical in processing time as compared with known methods such as the Viterbi equalizer.

Another object of the invention is to provide a method of this kind which simultaneously estimates the symbols transmitted and eliminates intersymbol interference.

Another object of the invention is to provide a method and a device applicable to mobile reception, and in particular in radio communication systems. Another object of the invention is to provide a method and a device which are entirely compatible with the various GSM recommendations.

SUMMARY OF THE INVENTION

In one aspect, the invention consists in a method for equalizing a digital signal to combat intersymbol interference in which each sample received is associated with an estimated symbol representing the transmitted symbol, which method comprises an iterative stage of intersymbol interference elimination, each iteration comprising for each sample of a set of received samples whose value has not been determined during a previous iteration:

comparing said sample with at least one confidence threshold and if said sample exceeds any of said thresholds:

associating with said sample an estimated symbol whose value depends on said threshold exceeded, the value of said sample being then determined; and eliminating the intersymbol interference caused by said estimated symbol to other samples belonging to said set of received samples.

In this method, the first step is to fix the symbol value representing the most reliable samples and the interference that they cause to the other samples is then eliminated. The value of the respective symbols can then be determined more easily during subsequent iterative steps.

In the case of equalizing a digital signal transmitted in the form of data packets, each packet comprising at least one learning sequence containing symbols known to the receiver and at least one data sequence containing wanted symbols, the method advantageously comprises a preliminary stage of eliminating intersymbol interference caused to a set of samples representing wanted symbols of said packet by each of said known symbols, said iterative stage taking into account all of said wanted symbols of said packet.

The known symbols provide a sure way to eliminate a first part of the intersymbol interference on a first pass without any estimation error.

These packets may comprise, for example, two data sequences separated by a learning sequence as specified by the GSM.

The method preferably comprises a stage of digitizing the received signal to supply the received samples, a stage of estimating the impulse response of the transmission channel to supply a set of autocorrelation coefficients and a stage of filtering said received samples to supply filtered samples, said intersymbol interference elimination stages then comprising, for a given symbol, subtracting from each filtered sample of said set of received samples the product of said given symbol by the autocorrelation coefficient $C_i$ where i represents the number of samples between said sample to be equalized and the sample corresponding to said given symbol.

In an advantageous embodiment said confidence thresholds are proportional to the autocorrelation coefficient $C_0$.

It is advantageous to modify the value of the confidence thresholds according to the channel response.

Said confidence thresholds are preferably greater in absolute value than the sum of all the autocorrelation coefficients $C_i$ other than $C_0$.

Said thresholds advantageously decrease as said iterations proceed.

As the iterations proceed intersymbol interference is eliminated. The decision can therefore be taken with lower thresholds.

If the digital signal is made up of symbols that can take either of two opposite values, the operation of comparison with at least one threshold advantageously consists in comparing the absolute value of said samples with a single threshold, the operation of associating an estimated symbol taking account of the sign of said symbol.

In a second aspect, the invention consists in any equalization device implementing the method defined above, irrespective of the field of application. It applies, in particular, but not exclusively, to equalization in cellular radio systems.

In a third aspect the invention consists in any application of the method defined above to cellular radio systems.

Other features and advantages of the invention will emerge from the following description of a preferred embodiment of the invention given by way of non-limiting example only with reference to the appended drawings.

BRIEF DESCRIPTION OF THE DRAWINGS

FIG. 3 is a flowchart of an equalization method in accordance with the invention.

DETAILED DESCRIPTION OF THE INVENTION

The invention is based on the following analysis: in a set of received samples some are less affected than others by intersymbol interference. It is therefore easier to determine the value of the former symbols.

The invention exploits this, by carrying out equalization in at least two successive passes:

eliminating intersymbol interference caused by symbols whose values have been fixed with a certain degree of confidence;

eliminating intersymbol interference caused by at least some other symbols whose value can be determined more easily than during the first pass because some intersymbol interference has already been eliminated.

This iterative method can naturally comprise more than two passes.

It is clear that the method may be applied to equalizing any type of digital signal provided that means are available for eliminating intersymbol interference caused by an estimated symbol.

The embodiment described in detail hereinafter by way of example is more particularly concerned with the GSM cellular radio system. As mentioned in the preamble, in this system data is exchanged in the form of packets.

Figure 1:
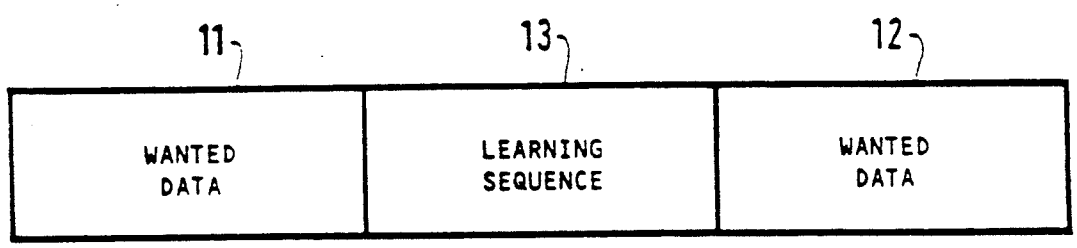
FIG. 1 shows the data packet format in the preferred embodiment described.

FIG. 1 shows the packet structure. A packet comprises two areas 11 and 12 containing wanted data separated by a learning sequence 13.

The learning sequence 13 is used among other things to characterize the transmission channel and so deduce therefrom the intersymbol interference values. This presupposes that the characteristics of the channel remain stable over the period of a packet. In order to subtract the intersymbol interference it then remains to identify the data symbols.

A guard time is provided between packets.

Figure 2:
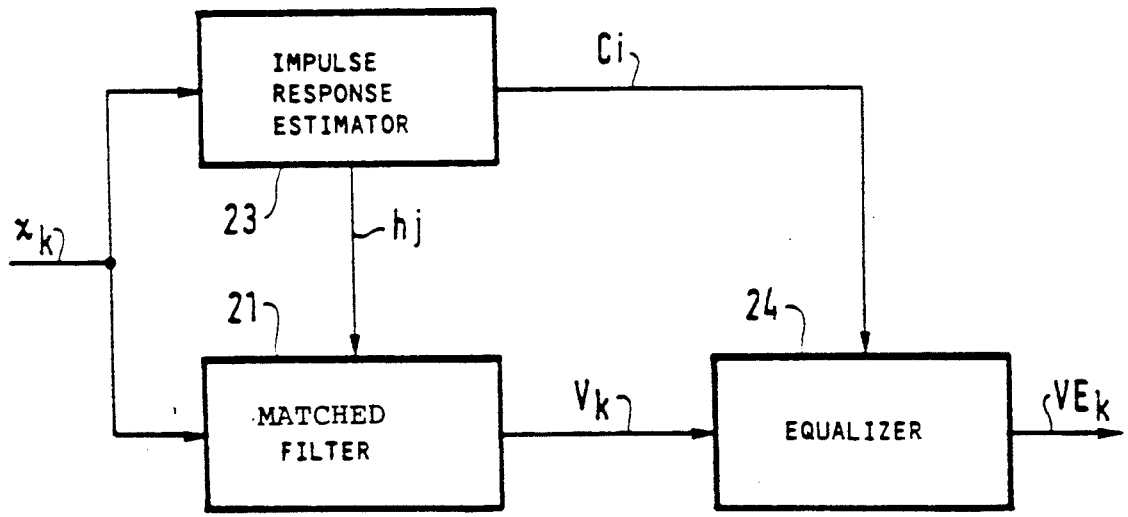
FIG. 2 is a block diagram of a receiver in accordance with the invention.

FIG. 2 is a block diagram of a device implementing a method in accordance with the invention.

$X_k$ are the symbols transmitted (either the learning sequence symbols or the wanted data symbols) and $x_k$ are the received signal samples transposed into the baseband and sampled. If the characteristic of the transmission channel is h(t), then:

$$x_k = \sum_{j=0}^{Nr-1} X_{k-j} \cdot h_j$$

where Nr is the impulse response duration expressed as a number of symbol periods.

The signal $x_k$ is fed to a matched filter 21 designed to compensate disturbances introduced by the transmission channel. Its characteristic is therefore $h^*(-t)$. It supplies filtered samples $V_k$.

The characteristic of the filter 21 is continuously adapted using coefficients hj of the impulse response of the channel produced by an impulse response estimator module 23 from the samples $x_k$. The module 23 also supplies the autocorrelation coefficients $C_i$ used to perform equalization as described below.

The transmission channel/filter 21 combination may be represented as follows:

$$X_k \xrightarrow{C(t)} V_k$$

where:
$C(t) = h(t) * h^*(-t)$

Therefore:

$$V_k = \sum_{i=-Nr+1}^{Nr-1} X_{k+1} \cdot C_i$$

in which $C_i$ is the autocorrelation coefficient:

$$C_i = \sum_{j=0}^{Nr-1-i} h_j \cdot h_{j+1}^*$$

$$C_0 = \sum_{j=0}^{Nr-1} |h_j^2|$$

$C_{-i} = C_i$ for $1 \leq i \leq Nr - 1$
Therefore:

-continued
$$V_k = X_k \cdot C_0 + \sum_{i=-Nr+1}^{-1} X_{k+i} \cdot C_i + \sum_{i=1}^{Nr-1} X_{k+i} \cdot C_i$$

The function of the equalizer module 24 is to eliminate the last two terms of this sum to obtain the equalized sample $VE_k = X_k * C_0$.

In the remainder of this description, the term $$\sum_{i=-Nr+1}^{-1} X_{k+i} \cdot C_i + \sum_{i=1}^{Nr-1} X_{k+i} \cdot C_i$$

is referred to as the interfering term.

In other words, the transmission channel is characterized by estimating its impulse response. The received signal transposed into the baseband and sampled is fed to a matched filter. After this filtering the interfering terms are equal to the real parts of the autocorrelation coefficients of the received signal. equalization method in accordance with the invention processes the real part of the output signal from the matched filter.

The invention proposes a new and advantageous method #or carrying out this equalization. FIG. 3 is a simplified flowchart of this method.

For each data packet, the first stage 31 is to eliminate the intersymbol interference caused by each of the known symbols $A_k$ of the learning sequence(s). Stage 31 is present only in the case of signals or packets comprising a learning sequence, of course. (In a specific embodiment, provision may be made for only some packets to comprise learning sequences, for example, or there may be special learning packets sent regularly and/or on request.) This has the advantage of eliminating a first part of the intersymbol interference using reliable values, each receiver knowing the learning sequences.

Each filtered sample $V_k$ representing a wanted symbol of the packet is then considered. The next stage (32) is to determine if a decision has already been taken as to the value of the respective symbol $E_k$ during a previous iteration. It is clear that the intersymbol interference caused by a sample must be eliminated once only. Of course, for the first iteration this st/age 32 (which asks the question "decision on $E_k$ taken?") is not implemented or is transparent.

If this decision has already been taken the method goes directly (33) to the next sample. Otherwise, the value of the filtered sample is compared (34) with one or more confidence thresholds.

If no comparison result is good, in other words if the value of the sample in question is not sufficiently close to the value of one of the authorized symbols, no processing is carried out. The method proceeds to the next sample (35).

Otherwise, the symbol $E_k$ respective to the filtered sample $V_k$ is estimated (36) by assigning it the value of the authorized symbol which satisfies the comparison. After this a decision has been taken as to $E_k$ in the sense relevant to stage 32.

The intersymbol interference caused by this sample is then eliminated (37) on the assumption that it is the symbol $E_k$ which was sent. As explained above, this elimination consists in, for example, subtracting the product $E_k \cdot C_i$ from each sample under consideration. This operation is advantageously applied only to samples for which a decision has not yet been taken.

It is not necessary to continue to eliminate intersymbol interference from samples already processed.

The next stage (38) is to increment the sample counter in order to process (39) the next sample $V_{k+1}$. If it is the last sample of the packet the method proceeds to the next iteration (40).

If the last iteration has been done equalization is finished. The method processes the next packet of data (41).

Otherwise the thresholds used in stage 34 are revised downwards (42) and a new iteration is undertaken (43).

The threshold modification stage 42 is not mandatory but is particularly advantageous. It is possible to allow for more and more samples on each successive iteration as the intersymbol interference is reduced each time.

In a preferred embodiment the thresholds are proportional to the autocorrelation coefficients $C_0$. It is beneficial to vary the thresholds according to disturbances affecting the transmission channel at a given time.

To take a decision it is assumed that the various thresholds S are such that:

$$S \geq \sum_{i \neq 0} C_i$$

This is the usual case.

In the specific case of the packets from FIG. 1, processing may proceed in two phases: first the interfering terms caused by the known symbols Na which are part of the learning sequence are eliminated. Then the interfering terms caused by data symbols which are part of the data sequences on each side of the learning sequence are eliminated.

Elimination therefore proceeds by way of successive iterations. An iteration is effected on all the real samples which represent data symbols. For each sample it verifies first whether a decision has been taken on the respective symbol and then, if no decision has been taken and if the absolute value of the sample exceeds a particular threshold, it decides the value of the respective symbol transmitted and eliminates the interfering terms generated by the detected symbol.

There is described below an algorithm for this situation in which the parameters are defined as follows:
Na: length of learning sequence
$A_m(1, Na)$ : real value learning sequence
ifir: rank of sample representing first symbol of learning sequence
ilas: rank of sample representing last symbol of learning sequence
ista: rank of first sample of series at matched filter output for equalization
iend: rank of last sample of series at matched filter output for equalization
Nr: impulse response duration expressed as a number of symbol periods
iter: number of iterations (two, for example)
thr j $(1, iter)$: series of comparison thresholds
Np: length of series at matched filter output
INPUTS
$V_k$ $(k=1, Np)$: series of filtered real samples
$C_{i(i=0, Nr-1)}$: autocorrelation coefficients OUTPUTS
$VE_k$ $(k=ista, iend)$: series of equalized real samples
The processing is therefore as follows:
1. Initialize values of series $VE_k$:
$VE_k = V_k$ for $k = ista, iend$ 2. Eliminate interfering terms caused by the symbols of the learning sequence and which affect the respective samples:

```
repeat m = 0, Nr−2
   repeat i = m+1, Nr−1
      VE_{ilas+i−m} = VE_{ilas+i−m} − A_{Na−m} · C_i
      VE_{ifir−i+m} = VE_{ifir−i+m} − A_{m+1} · C_i
   end repeat
end repeat
```

3. Initialize decision indicators $D_k$ $$D_k = 0 \text{ for } k = \text{ista, ifir}−1 \text{ and for } k = \text{ilas}+1, \text{iend}$$

4. Eliminate interfering terms caused by data symbols

```
repeat twice  (counting of data sections)
   ksta = ifir − 1    (rank of first sample evaluated)
   kend = ista        (rank of last sample evaluated)
   inc = −1
   repeat j=1, iter  (counting of iterations)
      bar = C_0 ·|thr_j
      repeat for k = ksta, kend (conting of samples)
         if D_k = 0 then
            if (|VEk| − bar) > 0 then
               VE_{k+i}=VE_{k+i}−sign(VE_k) · C_i for i = 1, Nr−1
               VE_{k−i}=VE_{k−i}−sign(VE_k) · C_i for i = 1, Nr−1
               D_k = 1
            end if
         end if
         k = k + inc
      end repeat (sample processing)
   end repeat (equalization iteration)
   ksta = ilas + 1
   kend = iend
   inc = −inc
```

Note that this algorithm uses the properties of the packets from FIG. 1. The interfering terms are eliminated on the basis of the learning sequence 15 by giving consideration simultaneously to the samples of the data sequences 11 and 12. Note that threshold processing is effected in a single operation and considers the absolute value of the sample. Symbols can take only the two values −1 and +1. When a decision is taken (the threshold is crossed), only the sign of the sample is considered, and this is taken as an estimated symbol. The above algorithm has been implemented on an ST 18930 signal processor to demodulate:

so-called normal packets (packets representing, for example, a traffic channel (TCH) of the GSM recommendations) with the following parameter values:

| | | | |
|---|---|---|---|
| Np | = 148 | Na | = 26 |
| ifir | = 62 | ilas | = 87 |
| ista | = 4 | iend | = 145 |
| Nr | = 5 | iter | = 2 | so-called SCH packets (packets representing a GSM synchronization channel) with the following parameter values:

| | | | |
|---|---|---|---|
| Np | = 148 | Na | = 64 |
| ifir | = 43 | ilas | = 106 |
| ista | = 4 | iend | = 145 |
| Nr | = 5 | iter | = 2 |

In this embodiment an equalizer in accordance with the invention requires only 55 computing cycles if two iterations are carried out. For an equivalent implementation a 16-state Viterbi equalizer requires 170 cycles to process a symbol.

Simulations have shown that the performance of the equalizer proposed is equivalent to the performance of a Viterbi equalizer for signal to noise ratios below 12 dB and for most of the profiles specified by the GSM.

It meets the requirements of the GSM standard in all cases.

Enhanced performance is obviously obtained if the number of iterations is increased.

An advantage of a method in accordance with the invention is that it enables transmitted symbols to be estimated simultaneously with the elimination of interference caused by these symbols. The processing time is therefore proportional to $N_r$ and to iter.

Other algorithms and other implementations of the invention are naturally feasible. The adaptations required to the various situations that may arise will be obvious to the man skilled in the art. It is possible to adapt the invention to all types of digital signals, whether transmitted in the form of packets or not and whether they comprise learning sequences or not.

There is claimed:

1. An iterative method for equalizing a received digital signal to combat intersymbol interference in which each sample received is associated with an estimated symbol representing the transmitted symbol, each iteration comprising the steps of:
    selecting a sample from a set of received samples whose value has not been fixed during a previous iteration;
    proceeding with an interference elimination sequence comprising the steps of:
    comparing the sample with at least one confidence threshold;
    if said sample exceeds any said threshold, the further steps of:
        associating with said sample an estimated symbol whose value depends on the threshold thus exceeded, the value of said sample being then fixed; and
        using said estimated symbol to eliminate the intersymbol interference caused by the estimated symbol to such samples whose respective values have not already been fixed; and
    if said sample does not exceed said threshold, the further steps of:
        selecting another received sample which has not been already selected during this iteration and proceeding with another said interference elimination sequence for said another received sample.

2. A method according to claim 1 wherein:
    said digital signal is transmitted in the form of data packets each comprising at least one learning sequence containing symbols known to the receiver and at least one data sequence containing wanted symbols, and
    said method further comprises a preliminary step of eliminating intersymbol interference caused to a set of samples representing all said wanted symbols of said packet by each of said known symbols.

3. A method according to claim 1 wherein said method further comprises the steps of estimating the impulse response of a transmission channel to supply a set of autocorrelation coefficients and filtering said received samples to supply filtered samples, and said step of using said estimated symbol to eliminate the intersymbol interference comprises, for a given symbol whose value has not yet been fixed, further comprises the step:

subtracting from the filtered sample corresponding to said given symbol, the product of the fixed value of the estimated symbol by the autocorrelation coefficient $C_i$, where i is representative of the number of samples between said given symbol and said estimated symbol.

4. A method according to claim 3 wherein each said confidence threshold is proportional to the autocorrelation coefficient $C_0$.

5. A method according to claim 4 wherein each said confidence threshold is greater in absolute value than the sum of all the autocorrelation coefficients $C_i$ other than $C_0$.

6. A method according to claim 1 wherein successive said confidence thresholds decrease as said iterations proceed.

7. A method according to claim 2 wherein each of said data packets comprises two data sequences separated by a learning sequence.

8. A method according to claim 1 wherein
each of said symbols can take either of two opposite values,
the comparing step compares the absolute value of said sample with a single threshold and
the associating step takes account of the sign of said sample.

9. A device for equalizing a digital signal to combat intersymbol interference using an iterative method of intersymbol interference elimination in which each sample received is associated with an estimated symbol representing the transmitted symbol, each iteration comprising the steps of
selecting a sample from a set of received samples whose values has not been fixed during a previous iteration;
proceeding with an interference elimination sequence comprising the steps of:
comparing the sample with at least one confidence threshold;
if said sample exceeds any said threshold, the further steps of:
associating with said ample ion estimated symbol whose value depends on the threshold thus exceeded, the value of said sample being then fixed; and
using said estimated symbol to eliminate the intersymbol interference caused by the estimated symbol to such samples whose respective values have not already been fixed; and
if said sample does not exceed said threshold, the further steps of:
selecting another received sample which has not been already selected during this iteration and proceeding with another said interference elimination sequence for said another received sample.

10. A device according to claim 9 wherein
said digital signal is transmitted in the form of data packets each comprising at least one learning sequence containing symbols known to the receiver and at least one data sequence containing wanted symbols, and
the iterative method further comprises a preliminary step of eliminating intersymbol interference caused to a set of samples representing all said wanted symbols of said packet by each of said known symbols.

11. A device according to claim 9 wherein
said iterative method further comprises the steps of
digitizing the received signal to supply received samples,
estimating the impulse response of the transmission channel to supply a set of autocorrelation coefficients and
filtering said received samples to supply filtered samples,
and said step of using said estimated symbol to eliminate the intersymbol interference further comprises, for a given symbol whose value has not yet been fixed, the step of:
subtracting from the filtered sample corresponding to said given symbol, the product of the fixed value of the estimated symbol by the autocorrelation coefficient $C_i$, where i is representative of the number of samples between said given symbol and said estimated symbol.

12. A device according to claim 11 wherein each of said confidence threshold is proportional to the autocorrelation coefficient $C_0$.

13. A device according to claim 12 wherein each said confidence threshold is greater in absolute value than the sum of all the autocorrelation coefficients $C_i$ other than $C_0$.

14. A device according to claim 9 wherein successive said confidence thresholds decrease as said iterations proceed.

15. A device according to claim 10 wherein each of said data packets comprises two data sequences separated by a learning sequence.

16. A device according to claim 9 wherein: each of said symbols can take either of two opposite values,
the comparing step compares the absolute value of said sample with a single threshold, and
the associating step takes account of the sign of said sample.

17. An iterative method of intersymbol interference elimination for equalizing a digital signal to combat intersymbol interference in a cellular radio system in which each sample received is associated with an estimated symbol representing the transmitted symbol, each iteration comprising the steps of:
selecting a sample from a step of received samples whose value has not been fixed during a previous iteration;
proceeding with an interference elimination sequence comprising the steps of:
comparing the sample with at least one confidence threshold;
if said sample exceeds any said threshold, the further steps of:
associating with said sample an estimated symbol whose value depends on the threshold thus exceeded, the value of said sample being then fixed; and
using said estimated symbol to eliminate the intersymbol interference caused by the estimated symbol to such samples whose respective values have not already been fixed; and if said sample does not exceed said threshold, the further steps of:
  selecting another received sample which has not been already selected during this iteration and proceeding with another said interference elimination sequence for said another received sample.

18. A method according to claim 17 wherein:
  said digital signal is transmitted in the form of data packets each comprising at least one learning sequence containing symbols known to the receiver and at least one data sequence containing wanted symbols, and
  said method further comprises a preliminary step of eliminating intersymbol interference caused to a set of samples representing all said wanted symbols of said packet by each of said known symbols.

19. A method according to claim 17 wherein
  said method further comprises the steps of:
    digitizing the received signal to supply received samples,
    estimating the impulse response of the transmission channel to supply a set of autocorrelation coefficients and
    filtering said received sample to supply filtered samples, and
  said step of using said estimated symbol to eliminate the intersymbol interference comprises, for a given symbol whose value has not yet been fixed, further comprises the step:
    subtracting from the filtered sample corresponding to said given symbol, the product of the fixed value of the estimated symbol by the autocorrelation coefficient $C_i$, where is is representative of the number of samples between said given symbol and said estimated symbol.

20. A method according to claim 19 wherein each said confidence threshold is proportional to the autocorrelation coefficient $C_0$.

21. A method according to claim 20 wherein each said confidence threshold is greater in absolute value than the sum of all the autocorrelation coefficients $C_i$ other than $C_0$.

22. A method according to claim 17 wherein successive said confidence thresholds decrease as said iterations proceed.

23. A method according to claim 17 wherein each of said data packets comprises two data sequences separated by a learning sequence.

24. A method according to claim 17 wherein
  each of said symbols can take either of two opposite values,
  the comparing step compares the absolute value of said sample with a single threshold, and
  the associating step takes account of the sign of said sample.

* * * * *